United States Patent [19]

Takao et al.

[11] Patent Number: 4,537,936

[45] Date of Patent: Aug. 27, 1985

[54] DIENE RUBBER COMPOSITION, METHOD OF PREPARING THE SAME AND TIRE EMPLOYING SAID COMPOSITION

[75] Inventors: Hiroyoshi Takao, Chiba; Keisaku Yamamoto, Ichihara; Akio Imai, Ichihara; Nobuyuki Yoshida, Ichihara; Hiroshi Furukawa, Kobe; Yuichi Saito, Nishinomiya; Akio Okumura, Kobe, all of Japan

[73] Assignees: Sumitomo Chemical Company, Limited, Osaka; Sumitomo Rubber Industries, Limited, Kobe, both of Japan

[21] Appl. No.: 371,020

[22] Filed: Apr. 22, 1982

[30] Foreign Application Priority Data

Apr. 30, 1981 [JP] Japan ................................. 56-66381
Apr. 30, 1981 [JP] Japan ................................. 56-66679

[51] Int. Cl.³ ............................ C08L 9/00; C08L 9/06
[52] U.S. Cl. ................................. 525/236; 152/209 R; 525/250; 526/86
[58] Field of Search ................... 525/236, 250; 526/86

[56] References Cited

U.S. PATENT DOCUMENTS

| | | | |
|---|---|---|---|
| 3,278,644 | 10/1966 | Zelinski | 525/236 |
| 3,281,389 | 10/1966 | Hirshfield | 525/236 |
| 3,344,206 | 9/1967 | Short | 525/236 |
| 3,669,943 | 6/1972 | Komatsu et al. | 526/86 |
| 4,304,885 | 12/1981 | Omori et al. | 525/236 |
| 4,341,886 | 7/1982 | Freppel | 525/236 |

FOREIGN PATENT DOCUMENTS

| | | | |
|---|---|---|---|
| 700959 | 12/1964 | Canada | 525/236 |
| 1107447 | 8/1981 | Canada . | |
| 12133 | 1/1980 | Japan . | |
| 964931 | 7/1964 | United Kingdom | 525/236 |
| 1261371 | 1/1972 | United Kingdom . | |

*Primary Examiner*—Wilbert J. Briggs, Sr.
*Attorney, Agent, or Firm*—Stevens, Davis, Miller & Mosher

[57] ABSTRACT

A diene rubber composition comprising 25 to 90 parts by weight of at least one high molecular weight diene rubber (A) having an intrinsic viscosity [$\eta$] of at least 2.0 and a glass transition point of not lower than $-50°$ C. and 75 to 10 parts by weight of at least one low molecular weight diene rubber (B) having an intrinsic viscosity [$\eta$] of 0.01 to 2.0, said composition having an average intrinsic viscosity of at least 1.8.

Since this composition has an excellent wet grip and rolling resistance property and moreover has excellent processability, it is employed as tire tread rubber.

5 Claims, 1 Drawing Figure

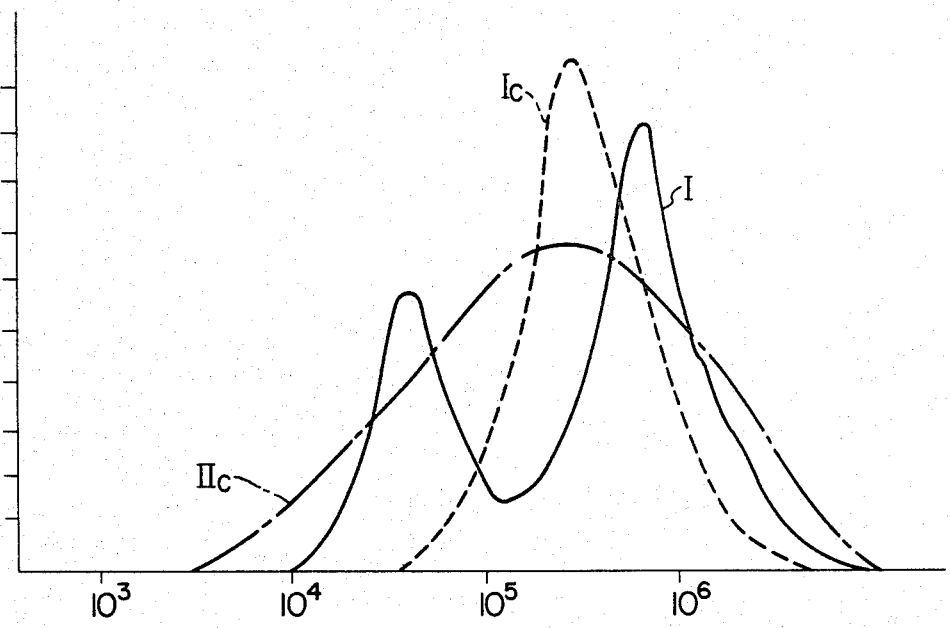

DIENE RUBBER COMPOSITION, METHOD OF PREPARING THE SAME AND TIRE EMPLOYING SAID COMPOSITION

This invention relates to a diene rubber composition, particularly to a rubber composition comprising a mixture of a high molecular weight diene rubber and a low-molecular weight diene rubber, a method of preparing the same and a tire employing said composition in the tread.

The principal characteristics required for tire rubber include wet grip property, rolling resistance (low heat build up), abrasion resistance, flex resistance, resistance to chipping and resistance to groove cracking. Furthermore, the rubber needs to possess these characteristic in good overall balance. Especially in recent years, the social demands have grown stronger for reduction of rolling resistance from the standpoint of saving natural resources and energies, and for improving wet grip property from the standpoint of safety of drivers.

Main rubbers heretofore used for tires include natural rubber, synthetic polyisoprene rubber, high cis-1,4 polybutadiene rubber and styrene-butadiene rubber. The former three have low energy loss and low rolling resistance, but have poor grip on the wet road surface. On the other side, the last mentioned rubber has a high wet grip property, but has large energy loss and high rolling resistance. Accordingly, the rolling resistance and wet grip are generally recognized as antinomic properties, and in order to solve this problem a compounding technique is employed in which two types of rubbers are blended to select a point where the two properties are in harmony. For tires used in passenger cars, for example, blends of styrene-butadiene rubber and high-cis polybutadiene are mainly used. However, the present state of the art is considered far from sufficient for the level demanded in recent years with regard to keeping a high wet grip property and keeping low rolling resistance at the same time. Recently, compositions of diene rubbers having unsaturated side chains have come to be given attention. For example, in British Pat. No. 1,261,371, Japanese Patent Application kokai (Laid-open) Nos. 62248/1979 and 12133/1980, there are described that two properties mentioned above are relatively improved as compared with compositions using general purpose diene rubbers. In order to improve the above properties, the present inventors have carried out, on one hand, basic research on the two characteristics hitherto considered antinomic and, on the other hand, studies of rubber compositions having excellent processabilites in kneading, rolling and extruding, which are required for the production of tires in practice.

The rolling resistance of a tire is attributable to energy loss accompanying repeated deformation of a running tire. That is to say, a tire undergoes compression deformation, bending deformation and shear deformation under load, and the deformations move continuously along the circumference of the tire during the running of a car. This is accompanied with mechanical energy loss during the repetition of various deformations and recoveries in various parts of a tire. In other words, rubber-like substances including those for tires are so called viscoelastomers. Their stress-strain relationships are non-linear and the strain shows a time lag in following the stress. Owing to such viscoelastic property of a tire, deformations at grounding and recoveries at leaving the ground are repeated during the running of a tire, and phase difference between stress and strain occurs resulting in hysteresis loss, i.e. energy loss. Improving the rolling resistance is nothing but reducing such energy loss. It is known that this energy loss is influenced, besides by the structure of a carcass and a breaker of a tire and the composition of sidewall rubber, largely by the composition of tread rubber in particular. Therefore, in order to reduce the rolling resistance of a tire from the standpoint of the composition of tread rubber, it is necessary to reduce the energy loss due to compression deformation, bending deformation and shear deformation of tread rubber. Considering the dynamic viscoelastic characteristics of rubber, this means the reduction of loss compliance $(E''/(E^*)^2)$ and loss modulus $(E'')$.

On the other hand, the wet grip property is considered to correspond to frictional resistance generated against the stress given from the road surface when a tire slides on a rough road surface. In other words, since a viscoelastomer such as a tire shows a recovery from deformation with a time lag to the given stress, a torque of a reverse direction to the running direction is generated, the resistance by this torque being the frictional resistance and depending on loss tangent (tan $\delta = E''/E'$), a dynamic viscoelastic characteristic (Journal of the Rubber Society of Japan, 43, No. 11, 1970).

Accordingly, although both of wet grip property and rolling resistance property depend on the dynamic loss characteristics of rubber $(E'', E''(E^*)^2, E''/E')$, the wet grip property improves with increasing of these values in contrast with rolling resistance. To sum up, the dynamic loss characteristic values are desirable to be large with regard to wet grip property, and to be small with regard to rolling resistance in the other hand. Accordingly, these two properties have hitherto been recognized as antinomic, and it has been considered impossible to obtain a product satisfactory in both of the two properties from one raw material.

However, the inventors have, after various studies, noted that wet grip property and rolling resistance property are different with regard to the range of velocity of deformation to which a material is subjected. Thus, while the rolling resistance depends on the velocity of deformation corresponding to the speed of revolution of a tire and being in a frequency range of 10-odd Hz., the wet grip property depends on the impulse given while sliding on a rough road surface, said impulse being in a very high frequency range. Thus, the ranges of frequency of deformation contributing to dynamic loss characteristics differ from each other in two properties.

Accordingly, it is possible to improve both of these two seemingly contradictory properties by making the loss characteristic value as low as possible in the low frequency range contributing to rolling resistance, and at the same time making the loss characteristic value as high as possible in the high frequency range contributing to the wet grip property. From such viewpoint, the inventors have studied the molecular structures, molecular weights and molecular weight distributions of polymers, and found out the followings.

(a) The wet grip property, which is a problem in the high frequency range, generally has a correlation with the glass transition point (Tg) of diene rubber, and the higher the glass transition point (Tg), the higher the wet grip property. Thus, the glass transition point corresponds to the motion of relatively short segments in polymer chains, and is influenced very markedly by microstructures of the polymer.

(b) The rolling resistance property, which is a problem in the low frequency range, is related with molecular weights or molecular weight distributions of diene rubber, and the wet grip property improves with the molecular weight becoming higher and the molecular weight distribution becoming narrower. This owes to the fact that the dynamic loss of a rubber composition depends more on molecular weights and molecular weight distributions rather than on microstructures of the polymer, and that the value of dynamic loss decreases with increasing number of long molecular chains.

From the facts as mentioned above, in order to obtain a rubber composition possessing both of high wet grip property and excellent rolling resistance property, it is necessary to select a diene rubber having a high molecular weight or a narrow molecular weight distribution and having a high glass transition point. However, a diene rubber satisfying such conditions generally shows marked defects in processability, such as poor band formation in roll operation, deficiency of fluidity in extrusion processing and large heat generation in kneading. It is a very important problem industrially to solve these defects in the tire manufacturing process.

The inventors have, after extensive studies, found that when a diene rubber satisfying the conditions mentioned in above (a) and (b) is blended with a diene rubber of a specified low molecular weight, the above mentioned defects in processability can be solved while keeping excellent wet grip property and rolling resistance property. Thus, this invention has been achieved based on this finding.

An object of the present invention is to provide a rubber composition having excellent wet grip and rolling resistance properties and also excellent processability and a method of preparing the same.

Another object of the present invention is to provide a tire which employs said rubber composition in the tread.

Other objects and advantages of the present invention will be made apparent from the following descriptions.

Annexed drawing shows the results of determination of molecular weight distribution.

In the drawing, I, Ic and IIc are the results of determination in Example 1, Comparative Example 1 and Comparative Example 2, respectively, as mentioned later.

On the abscissa is indicated the molecular weight, and on the ordinate is indicated the relative concentration.

Thus, according to the present invention, there is provided a diene rubber composition comprising 25 to 90 parts by weight of at least one high molecular weight diene rubber (A) having an intrinsic viscosity $[\eta]$ of at least 2.0, and a glass transition point of not lower than $-50°$ C. and 75 to 10 parts by weight of at least one low molecular weight diene rubber (B) having an intrinsic viscosity $[\eta]$ of 0.01 to 2.0, said composition having an average intrinsic viscosity of at least 1.8 as well as a tire employing said composition for the tread.

According to the present invention there is further provided the following method for preparing the above rubber composition:

In a multistage polymerization process for preparing a diene polymer comprising:

(A) 59 to 90% by weight of a high molecular weight polymer having a $\overline{M}w/\overline{M}n$ value of not more than 2, an intrinsic viscosity $[\eta]$ (measured in toluene at 30° C.) of 2 to 6 and a glass transition point of not lower than $-50°$ C., and (B) 10 to 50% by weight of a low molecular weight polymer having an intrinsic viscosity $[\eta]$ of 0.01 to 1.0, said diene polymer having an average intrinsic viscosity of at least 1.8 and having a polymodal molecular weight distribution, by polymerizing a conjugated diene compound, optionally in the presence of aromatic olefinic compounds, in a hydrocarbon solvent with an alkali metal or an organic alkali metal compound used as a polymerization initiator, and with a Lewis base selected from ether compounds and/or amine compounds used as a modifier, the improvement characterized in that:

(1) in the first stage, the polymerization is initiated by use of an initiator in an amount prescribed relative to the amount of a monomer so that a polymer having an intrinsic viscosity $[\eta]$ of 2 to 6 is obtained at the end of polymerization, and (2) in the second stage, at the additional addition of the initiator, a prescribed amount of the initiator is added at a point where prescribed conversion to polymer has been attained so that, at the end of polymerization, the newly formed polymer has a molecular weight of 0.01 to 1.0 as expressed in terms of an intrinsic viscosity and amount to 10 to 50% by weight of the total polymer, thereby preparing a diene polymer having a polymodal molecular weight distribution.

The embodiments of the present invention are further explained in detail in the following.

In the first place, a high molecular weight diene rubber (A) should have a glass transition point (Tg) of not lower than $-50°$ C. in order to keep a high wet skid property. Here, the glass transition point is related with the microstructure of polymer, and becomes higher with, in particular, increasing number of unsaturated side chain bondings. For example, the glass transition point becomes higher with increasing the content of 1,2-bonding for polybutadiene, 1,2- and 3,4-bonding for polyisoprene rubber and phenyl radical and ,2-bonding for styrene-butadiene copolymer. In particular, a polybutadiene with a glass transition point of $-50°$ C. has a content of 1,2-bonding of about 65 mol%. In the second place, in order to keep low dynamic loss, the intrinsic viscosity $[\eta]$ is required to be at least 2.0, preferably 2.5 to 5.0. Especially when intrinsic viscosity $[\eta]$ exceeds 5.0, it departs from practical range for processing while no further effect of reducing rolling resistance can be expected. Further, a high molecular weight diene rubber (A) with a relatively narrow molecular weight distribution having a ratio of weight average molecular weight ($\overline{M}w$) to number average molecular weight ($\overline{M}n$) of not more than 2.0 is desirable from the point of reducing the dynamic loss.

In the next place, a low molecular weight diene rubber (B) is used which has an intrinsic viscosity $[\eta]$ of 0.01 to 2.0, preferably 0.1 to 0.7. In order to keep the dynamic loss low, it is desirable for the rubber (B), likewise as for high molecular weight diene rubber (A), to have a narrow molecular weight distribution, namely a $\overline{M}w/\overline{M}n$ value of not more than 2.0. Further, for the purpose of improving the wet grip property, the glass transition point is desired to be not lower than $-50°$ C.

The amount of low molecular weight diene rubber (B) should be a sufficient one for improving the processability, namely 75 to 10 parts by weight, preferably 15 to 25 parts by weight per 100 parts by weight of total composition. Although mixing of a low molecular weight diene rubber in general tends to injure the mechanical property, and particularly to increase the energy loss, the adverse effect on dynamic loss is negligible when the high molecular weight diene rubber (A) has a sufficiently high molecular weight and a relatively narrow molecular weight distribution. The amount to be mixed of the low molecular weight diene rubber (B) is preferably adjusted according to its intrinsic viscosity [η]. Thus, the amount to be mixed per 100 parts by weight of total composition is 10 to 75 parts by weight for an intrinsic viscosity [η] range of 2.0 to 1.8, 15 to 70 parts by weight for a range of 1.8 to 1.0, 10 to 30 parts by weight for a range of 1.0 to 0.7 and 15 to 25 parts by weight for a range of 0.7 to 0.01.

Further, by making the rubber composition comprising a mixture of a high molecular weight diene rubber (A) and a low molecular weight diene rubber (B) have an average intrinsic viscosity $[\eta]_A$ of at least 1.8, preferably at least 2.3, a vulcanized product with low dynamic loss and with high mechanical properties can be obtained.

Here, the average intrinsic viscosity $[\eta]_A$ is defined by the following equation:

$$[\eta]_A = \frac{\sum\limits^{n} ([\eta]_n \times W_n)}{\sum\limits^{n} W_n},$$

wherein,
n: number of kinds of diene rubbers
[η]: intrinsic viscosities of diene rubbers
W: % by weight of diene rubbers.

The composition according to the present invention comprising a high molecular weight diene rubber (A) and a low molecular weight diene rubber (B) can be obtained by mixing the two components in the solid states or by mixing in the solution states. Further, the composition may be prepared as a polymer having a polymodal molecular weight distribution by a multistage polymerization process.

The diene rubber having a narrow molecular weight distribution used in the present invention may be prepared by polymerization with so called Ziegler-Natta catalyst, but it can be obtained relatively easily by a living anion polymerization process by use of an alkali metal (e.g. lithium, sodium and potassium) catalyst or an organic alkali metal catalyst containing said metals in a hydrocarbon solvent such as hexane and cyclohexane. Preparation of a diene rubber having a glass transition point of not lower than −50° C. is made possible by controlling the content of unsaturated side chains. For example, when a polymerization of butadiene or isoprene is carried out in the above polymerization system by using ethers such as tetrahydrofuran, Monoglyme and Diglyme and amine compounds such as dibutylamine as a modifier, the content of 1,2-bonding in polybutadiene or those of 1,2- and 3,4-bonding in polyisoprene can be controlled easily by varying the amount of above modifier.

The method of preparation for a polymer having a polymodal molecular weight distribution according to the present invention is explained in more detail below.

The hydrocarbon solvent used in the method of the present invention is, for example, an aromatic hydrocarbon such as benzene, toluene, xylene and ethylbenzene, an aliphatic hydrocarbon such as hexane and heptane and an alicyclic hydrocarbon such as cyclopentane, cyclohexane and methyl cyclohexane. They may be used alone or as a mixture of two or more kinds of them.

In particular, aliphatic hydrocarbons and alicyclic hydrocarbons are preferably used.

The polymerization initiator used in the method of the present invention is an alkali metal such as sodium, potassium and lithium, or an organic alkali metal compound containing such an alkali metal atom. In particular, organic lithium compounds are preferably used since many of them are soluble in hydrocarbon solvents.

These organic lithium compounds are generally known as one-end or both-end initiating type anion polymerization initiators, and include, for example, ethyl lithium, propyl lithium, butyl lithium, amyl lithium, trimethylene dilithium, tetramethylene dilithium, hexyl lithium, cyclohexyl lithium, phenyl lithium, tolyl lithium and naphthyl lithium as well as such compounds as lithium complexes with condensed or non condensed aromatic ring, oligobutadienyl dilithium or oligoisoprenyl dilithium in living state.

The polymerization with these alkali metal compound proceeds, as is well known, by the living anion polymerization mechanism, and is very favorable for providing a polymer having a narrow molecular weight distribution of the present invention.

In order to control the microstructure of the polymer, in particular the content of unsaturated side chain radicals, Lewis base compounds selected from the group consisting of ethers or tertiary amines are used as modifiers.

Examples of the ether compounds include a cyclic ether such as tetrahydrofuran, tetrahydropyran and 1,4-dioxane, an aliphatic monoether such as diethyl ether and dibutyl ether, an aliphatic polyether such as ethylene glycol dimethyl ether, ethylene glycol dibutyl ether, diethylene glycol dimethyl ether, diethylene glycol diethyl ether, and diethylene glycol dibutyl ether, and an aromatic ether such as diphenyl ether and anisole.

Examples of tertiary amine compounds include such compounds as triethyl amine, tripropyl amine and tributyl amine as well as N,N,N′N′-tetramethyl ethylene diamine, N,N-dimethyl aniline, pyridine and quinoline.

These Lewis base compounds are effective also as a randomizing agent in copolymerization of a conjugated diene compound with an aromatic olefin compound.

Examples of conjugated diene compounds used in the method of the present invention include 1,3-butadiene, isoprene, piperylene, substituted butadienes such as 2,3-dimethyl-1,3-butadiene and 1-phenyl-1,3-butadiene, 1,3-pentadiene and its substitution derivatives, or mixtures of these compounds.

Further, aromatic olefin compounds such as styrene, α-methyl styrene and p-methyl styrene are copolymerized with above conjugated dienes as occasion demands.

Particularly, 1,3-butadiene, isoprene, piperylene and 2,3-dimethyl butadiene as well as styrene, α-methyl styrene and p-methyl styrene are preferred for their easy availability in the industrial execution of the invention.

Although polymerization may be effected at any temperature in a wide range of −100° C. to 200° C., from the points of polymerization velocity, solution viscosity and control of microstructure of polymer, it is carried out industrially at a temperature of 0° C. to 150° C., preferably 20° C. to 100° C.

The polymer in the present invention having a polymodal molecular weight distribution can be prepared by various methods. For example, the polymer can be obtained by preparing a high molecular weight polymer (A) and a low molecular weight polymer (B) in separate polymerization vessels respectively, mixing the two polymers in solution state in a prescribed proportion, and then evaporating the solvent from the solution to separate and obtain the polymer. However, a preferred method of preparation is the two stage polymerization effected by utilizing the living property of an initiator.

Thus, in the living anion polymer of the present invention, the molecular weight of the polymer is determined by the ratio of the amount of monomer (W) to the amount of initiator used (I). That is to say, the molecular weight ($\overline{Mn}$) is represented by the following equation:

$$\overline{Mn} = \frac{W}{I}$$

On the other hand, the intrinsic viscosity $[\eta]$ is represented by the following equation from Mark-Howink-Sakurada equation:

$$[\eta] = K\overline{Mn}^\alpha$$

K and α are constants intrinsic to a polymer, and can be determined from experiments. In the case of polybutadiene, for example, the following equation is applied:

$$[\eta]_{30°\,C.}^{toluene} = 4.03 \times 10^{-4}\,\overline{Mn}^{0.693}$$

Thus, in the preparation of the polymer of the present invention by two stage polymerization, the intended high molecular weight polymer (A) and low molecular weight polymer (B) can be prepared by (1) in the first stage polymerization, carrying out the polymerization after addition of an initiator to the monomer in an amount corresponding to that necessary for obtaining a high molecular weight polymer (A) having an intrinsic viscosity of 2 to 6, and (2) at a point where a prescribed conversion to polymer has been attained, carrying out the second stage step by adding newly a prescribed amount of an initiator corresponding to the formation of a low molecular weight polymer (B) having an intrinsic viscosity of 0.01 to 1.0. That is to say, the polymerization conditions can be designed optionally on the basis of the following equations:

$$\overline{Mn}_{(A)} = \frac{W_1 + W_2}{I_{(1)}}$$

$$\overline{Mn}_{(B)} = \frac{W_3}{I_{(2)}}$$

$$[\eta]_{(A)} = K\overline{Mn}_{(A)}^\alpha$$

$$[\eta]_{(B)} = K\overline{Mn}_{(B)}^\alpha$$

$$x = \frac{W_1}{W_1 + W_2 + W_3}$$

Herein, $\overline{Mn}_{(A)}$: molecular weight of a high molecular weight polymer, $\overline{Mn}_{(B)}$: molecular weight of a low molecular weight polymer, $W_1$: amount of a monomer consumed up to the second step addition of an initiator, $W_2$: amount of a monomer polymerized into a high molecular weight polymer after the second stage addition of an initiator, $W_3$: amount of a monomer polymerized into a low molecular weight polymer after the second stage addition of an initiator, $[\eta]_A$, $[\eta]_B$: intrinsic viscosity of A and B polymers, respectively, $I_{(1)}$: amount of an initiator added at the initial stage, $I_{(2)}$: amount of an initiator added at the second stage, x: conversion to polymer attained up to the second stage addition of an initiator.

In a similar way, it is possible to design a multistage (more than two stage) polymerization.

Although polymerization may be carried out in two stages or multistages by the use of one reactor, it is possible to prepare the polymer by using a multivessels reactor. Further, the monomers can be either added collectively in the initial stage, or parts thereof added additionally in multistages.

In order to obtain a polymer having a high wet skid property, the microstructure of the polymer is controlled by a modifier so that the polymer may have a glass transition point of not lower than $-50°$ C. In the above method giving a polymodal molecular weight distribution, however, the modifier does not influence the distribution substantially, and the microstructure can be controlled in a manner independent of the control of molecular weight distribution.

On the other side, in order to lower rolling resistance, namely to reduce dynamic loss, a high molecular weight and a narrow molecular weight distribution are preferred. In particular, the molecular weight of high molecular weight polymer contained as the main component in the composition should be at least 2, and preferably 2.5 to 6 as expressed in terms of an intrinsic viscosity.

Ideally, the higher the molecular weight, the less the dynamic loss. But in practice, troubles occur in mixing with fillers, and if the intrinsic viscosity goes over 6, the dynamic loss becomes worse owing to incomplete kneading.

The molecular weight distribution of high molecular weight polymer contained as the main component is preferably less than 2 as expressed by $\overline{Mw}/\overline{Mn}$ value. When the molecular weight distribution of a polymer is wider than above value, the dynamic loss increases because of decreased uniformity of cross linking.

In the fabrication of tire and so forth, for the purpose of keeping good physical properties, it is necessary that a high molecular weight is contained as the main component of composition. The content is 50 to 90% by weight, and preferably 70 to 90% by weight.

Since such high molecular weight polymer with narrow molecular weight distribution alone shows a very poor processability, a low molecular weight polymer having an intrinsic viscosity of 0.01 to 1.0, preferably 0.1 to 0.7 is contained in the polymer of the present invention. It was anticipated that dynamic loss of a polymer would worsen in general by a low molecular weight polymer being contained. However, it has been proved that a polymer of markedly improved, i.e. low, dynamic loss compared with the prior level is obtained by making the low molecular weight polymer contained in a high molecular weight polymer of above mentioned range of properties and content, and by making the whole polymer having an average molecular weight of at least 1.8, preferably at least 2.0 as expressed in terms of intrinsic viscosity. Concurrently, these polymers having a polymodal molecular weight distribution showed very good characteristics in processing, particularly in roll processing.

Since the molecular weight distribution of the low molecular weight polymer is not so important, a factor as that of the high molecular weight polymer, low molecular weight polymers having various molecular weight distributions may be used. However, those having a narrow molecular weight distribution of not more than 2 as expressed by $\overline{Mw}/\overline{Mn}$ value are preferred.

The low molecular weight polymer which is a smaller content component of the composition is effective even when its glass transition point is lower than $-50°$ C. However, for the purpose of keeping higher wet skid property, the glass transition point is preferably not lower than $-50°$ C.

As the high molecular weight diene rubber (A) and the low molecular weight diene rubber (B), there are employed, for example, polybutadiene, polyisoprene, styrene-butadiene copolymer, styrene-isoprene copolymer, isoprene-butadiene copolymer and butadiene-piperylene copolymer. These polymers can be employed either as a polymer composition of the same kind or as a mixture thereof.

This invention is illustrated below with reference to the examples, but the invention is not limited thereof.

Measurements of physical properties in Examples and Comparative Examples were carried out by the following method.

(a) Intrinsic viscosity [η]

Measurements were made in toluene as solvent at 30° C. by using Ostwald type solution viscometer.

(b) Glass transition point

Measurements were made at a rate of temperature rise of 20° C./minute by using differential scanning calorimeter (D.S.C.)(made by DuPont Co.). The transition temperature was determined from the position of peak of heat absorption accompanying the transition.

(c) Molecular weight distribution

As the instrument was used HLC-802UR (made by Toyo Soda). Columns $10^3$, $10^4$, $10^6$ and $10^7$ were chosen as the partition column. A refractometer was used as a detector. Measurement was made at 40° C. with tetrahydrofuran (THF) used as the developing solvent. The molecular weight value was calculated with standard monodisperse polystyrene used as the reference. The ratio of weight average molecular weight ($\overline{Mw}$) to number average molecular weight ($\overline{Mn}$), ($\overline{Mw}/\overline{Mn}$), was used for a measure of spread of molecular weight distribution.

(d) Wet skid resistance property

Measurements were made with vulcanized rubber sheets of 6.5 mm thickness by using "portable skid resistance tester" (made by Stanley & Co.). As the contacting road surface was chosen as asphalt surface sprayed with water at a temperature of 20° C.

(e) Dynamic loss value

"Dynamic solid viscoelastic property measuring instrument" (made by Toyo-Baldwin & Co.) was used. Measurements were made with vulcanized sheets at varying temperatures with an initial elongation of 0.6%, an amplitude of 0.1% and a frequency of 11 Hz.

(f) Roll processability

The temperature of 6" rolls was adjusted to 50° C. The polymer to be tested was made stick to the roll with varying roll nip of 0.7 mm, 1.0 mm, 1.5 mm and 2.0 mm. The state of the polymer was observed and was graded as follows.

| Grade | State of polymer on the roll |
|---|---|
| 5 | Excellent band formation on the roll is observed. Sheeting operation is easy. |
| 4 | Band formation on the roll is good. Initial "bite" is rather slow. |
| 3 | The rubber band on the roll lacks tackiness. Or, "bite" of the bank is rather poor. |
| 2 | Bagging or breaking of sheets occurs. |
| 1 | Initial "bite" is poor. Polymers don't form sheets or don't stick on the roll. |

(g) Viscoelastic characteristics

"Viscoelasticity spectrometer" (made by Iwamoto Seisakusho) was used. The test piece was 4 mm (width)×30 mm (length)×2 mm (thickness). Measurements were made at 70° C. with an initial strain of 10%, a frequency of 10 Hz and an amplitude of 2%.

(h) Content of 1,2-bonding

The content was determined by measuring the infrared absorption spectra of polymer by rock salt plate method on a spectrophotometer made by Hitachi Seisakusho and in a similar manner to the method of Kofman et al. [V. L. Kofman et al., Polymer Sou. USSR 21 (7), 1676, (1979)].

(i) Wet grip index

Wet grip index was measured with a sheet of 6.5 mm thickness obtained by press vulcanization of the composition by use of "portable skid resistance tester" (made by Stanley & Co.). As the contacting road surface was chosen an asphalt surface sprayed with water at a temperature of 20° C. Wet grip index is indicated in a relative value to a reference value of 100 of composition (A) (SBR recipe). A higher value indicates a higher wet grip property.

(j) Rolling resistance index

A steel radial tire 165SR13 using the rubber composition of a recipe shown in the table as tread rubber was attached to a rim of 4½J×13. Rolling resistance is measured on a drum of 60 inches diameter under the conditions of an air pressure of 2.1 kg/cm², a load of 300 kg and a velocity of 80 km/h. Rolling resistance index is indicated in a relative value to a reference value of 100 of composition A. A smaller value indicates more excellent rolling resistance property.

EXAMPLE 1

In an autoclave of 12 l capacity equipped with a stirrer and a jacket, the atmosphere was replaced with nitrogen, and 7 l of purified and dried n-hexane, 300 g of tetrahydrofuran and 1.2 mmol of n-butyl lithium dissolved in hexane were placed. The inner temperature was raised to 50° C., and 1000 g of butadiene was added to initiate polymerization.

At a point when polymerization was conducted for 75 minutes while keeping the inner temperature constant, about 5 ml of polymerization solution was taken out and was put into methanol. The polymer separated out was dried by heating in a hot press machine and was weighed. The result showed a conversion of polymerization of 74.8%. At this point, 4.8 mmol of n-butyl lithium was added additionally as a hexane solution, and polymerization was continued further at 50° C. After conducting the polymerization for a period of 150 minutes in total, one portion of polymerization solution was taken out and measured the conversion of polymerization. The conversion was 99.8%.

To the polymerization solution was added 20 ml of methanol to stop polymerization. After mixing with 20 g of 2,6-di-tert.-butyl-4-methylphenol (trade name: Sumilizer ® BHT, made by Sumitomo Chemical Co.), the polymerization solution was cast into hot water, and n-hexane was evaporated off.

The polymer separated out was dried under reduced pressure.

The polymer obtained was measured for various physical properties. The result is shown in Table 1.

The compounding recipe for obtaining a vulcanizate was as follows:

| Polymer | 100 parts |
|---|---|
| Carbon black | 60 parts |
| Aromatic oil | 20 parts |
| Zinc white | 5 parts |
| Stearic acid | 2 parts |
| Vulcanization accelerator | 2 parts |
| Sulphur | 1.6 parts |

The result of measurement of molecular weight distribution is shown in FIG. 1.

The properties of high molecular weight polymer and low molecular weight polymer calculated from the figure of molecular weight distribution are shown in Table 2.

It is demonstrated that the butadiene polymer obtained from Example 1 having a polymodal molecular weight distribution have high wet skid resistance, low dynamic loss and very good roll processability.

TABLE 1

| Intrinsic viscosity immediately before additional addition of initiator (dl/g) | 3.83 |
|---|---|
| Final intrinsic viscosity (dl/g) | 3.31 |
| Glass transition temperature of high molecular weight polymer (°C.) | −30.5 |
| Glass transition temperature of low molecular weight polymer (°C.) | −30.5 |
| Glass transition temperature of finally formed polymer (°C.) | −30.5 |
| Wet skid resistance property | 65 |
| Dynamic loss value | |
| $E'' \times 10^{-7}$ (dyne/cm$^2$) | 3.17 |
| $(E''/1E^{*1^2}) \times 10^{10}$ (dyne/cm$^2$)$^{-1}$ | 4.26 |
| $E''/E'$ (—) | 0.106 |
| Roll processability (Roll nip) | |
| 0.7 mm | 4 |
| 1.0 mm | 5 |
| 1.5 mm | 5 |
| 2.0 mm | 5 |

TABLE 2

| Conversion of polymerization at the second addition of initiator | 74.8% |
|---|---|
| Number average molecular weight of high molecular weight polymer | 584,000 |
| calculated intrinsic viscosity (dl/g) | 3.98 |
| Number average molecular weight of low molecular weight polymer | 38.000 |
| calculated intrinsic viscosity (dl/g) | 0.62 |
| Content of high molecular weight polymer (calculated value) | 79.4% by weight |
| Molecular weight distribution of high molecular weight polymer (Mw/Mn) | 1.52 |
| Molecular weight distribution of low molecular weight polymer (Mw/Mn) | 1.26 |

COMPARATIVE EXAMPLE 1

Polymerization was carried out in a similar manner to Example 1 except that 2.1 mmol of n-butyl lithium was added initially without additional addition. Physical properties of the polymer obtained is shown in Table 3. The molecular weight distribution of the polymer is shown in FIG. 1.

As can be seen from Table 3, the butadiene polymer having a monomodal molecular weight distribution and a high glass transition temperature, although it exhibits good properties of high wet skid resistance and of low dynamic loss, has very poor roll processability, and is a polymer with poor fabricating processability.

Accordingly, it was shown that the process of Comparative Example 1 is unsuitable for the method for preparing polymers having also an excellent roll processability which are the object of the present invention.

TABLE 3

| Intrinsic viscosity (dl/g) | 3.41 |
|---|---|
| Glass transition temperature (°C.) | −31.2 |
| Wet skid resistance property | 64 |
| Dynamic loss value | |
| $E'' \times 10^{-7}$ (dyne/cm$^2$) | 3.04 |
| $(E''/1E^{*1^2}) \times 10^{10}$ (dyne/cm$^2$)$^{-1}$ | 4.11 |
| $E''/E'$ (—) | 0.103 |
| Roll processability (Roll nip) | |
| 0.7 mm | 1 |
| 1.0 mm | 1 |
| 1.5 mm | 2 |
| 2.0 mm | 2 |
| Number average molecular weight of polymer | 463,000 |
| Molecular weight distribution (Mw/Mn) | 1.46 |

EXAMPLES 2–4

Procedures of Example 1 were repeated except that the kind and amount of a Lewis base compound used as a regulator for content of pendant unsaturated radical, the amount of initiator additionally added at the second stage and the conversion of polymerization at the point of the above additional addition were varied and that butadiene monomer was additionally added along with the initiator in certain case.

Conditions and results of polymerization are shown in Table 4.

As can be seen from Table 4, it was shown that all the butadiene polymers having a polymodal molecular weight distribution synthesized by the method of preparation of the present invention have high wet skid resistance property, low dynamic loss and very good roll processability.

COMPARATIVE EXAMPLES 2–4

For the purpose of comparison, measured values of physical properties of various rubber-like polymers not based on the method of the present invention were shown in Table 5.

Comparative Example 2 gives an example of butadiene rubber of high-cis content having a wide, monomodal molecular weight distribution not based on the method of the present invention.

The molecular weight distribution curve of this polymer was shown also in FIG. 1.

Although the polymer has high skid resistance property and good roll processability because of its high glass transition temperature of −40.7° C., the polymer has large dynamic loss and hence high rolling resistance, and accordingly is unsuitable for a rubber intended in the present invention.

Comparative Example 3 gives a high-cis polybutadiene. Though this polymer has a low rolling resistance, it has a low wet skid property and cannot be used alone in practice. Styrene-butadiene rubber of Comparative Example 4, although it has high wet skid property and good roll processability, has large dynamic loss and is unsuitable for a rubber intended in the present invention.

By comparing abovementioned Comparative Examples with Examples 1-4, it becomes apparent that polymers provided by the method of the present invention exhibit superior characteristics and better processabilities in comparison with various rubbers provided by prior, publicly known techniques.

TABLE 4

| Lewis base | | Example 2 Diethylene glycol di-n-butyl ether 3 g | Example 3 Tetrahydro-furan 90 g | Example 4 Diethylene glycol di-n-butyl ether 10 g |
|---|---|---|---|---|
| Amount of initiator added initially | (mmol) | 1.30 | 2.33 | 2.0 |
| Amount of initiator added additionally | (mmol) | 12.0 | 5.2 | 4.9 |
| Conversion of polymerization at additional addition | (%) | 66.8 | 71.0 | 78.8 |
| Amount of butadiene added additionally | (g) | 0 | 0 | 300 |
| Final intrinsic viscosity | (dl/g) | 3.67 | 2.06 | 3.10 |
| Content of high molecular weight polymer | (%) | 69.3 | 78.6 | 73.4 |
| calculated intrinsic viscosity | (dl/g) | 3.80 | 2.52 | 3.36 |
| Content of low molecular weight polymer | (%) | 30.7 | 21.4 | 26.6 |
| calculated intrinsic viscosity | (dl/g) | 0.45 | 0.61 | 0.72 |
| Molecular weight distribution of high molecular weight polymer | ($\bar{M}w/\bar{M}n$) | 1.61 | 1.43 | 1.58 |
| Molecular weight distribution of low molecular weight polymer | ($\bar{M}w/\bar{M}n$) | 1.36 | 1.24 | 1.3 |
| Glass transition temperature of high molecular weight polymer | (°C.) | −37.5 | −41.0 | −28.0 |
| Glass transition temperature of finally formed polymer | (°C.) | −37.5 | −41.0 | −28.0 |
| Wet skid resistance property | | 62 | 60 | 65 |
| Dynamic loss value | | | | |
| $E'' \times 10^{-7}$ (dyne/cm$^2$) | | 3.02 | 3.31 | 3.22 |
| $(E''/1E^{*2}) \times 10^{10}$ (dyne/cm$^2$)$^{-1}$ | | 4.09 | 4.21 | 4.13 |
| $E''/E'$ | | 0.101 | 0.126 | 0.113 |
| Roll processability (Roll nip) | | | | |
| 0.7 mm | | 4 | 5 | 4 |
| 1.0 mm | | 5 | 5 | 4 |
| 1.5 mm | | 5 | 5 | 5 |
| 2.0 mm | | 5 | 5 | 5 |

TABLE 5

| | | Comparative Example 2 High vinyl content butadiene rubber | Comparative Example 3 High-cis polybutadiene | Comparative Example 4 Styrene-butadiene rubber (SBR#1500) |
|---|---|---|---|---|
| Intrinsic viscosity | (dl/g) | 2.04 | 2.39 | 1.86 |
| Molecular weight distribution | ($\bar{M}w/\bar{M}n$) | 3.5 | 2.3 | 3.2 |
| Glass transition temperature | (°C.) | −40.7 | −110 | −58 |
| Wet skid resistance property | | 62 | 42 | 60 |
| Dynamic loss value | | | | |
| $E'' \times 10^{-7}$ (dyne/cm$^2$) | | 3.62 | 3.14 | 5.18 |
| $(E'/1E^{*2}) \times 10^{10}$ (dyne/cm$^2$)$^{-1}$ | | 4.37 | 4.11 | 4.41 |
| $E''/E'$ | | 0.142 | 0.109 | 0.156 |
| Roll processability (Roll nip) | | | | |
| 0.7 mm | | 4 | 2 | 5 |
| 1.0 mm | | 5 | 3 | 5 |
| 1.5 mm | | 5 | 3 | 5 |
| 2.0 mm | | 5 | 3 | 5 |

EXAMPLE 5

An experiment was carried out in a similar manner to Example 1 except that 1000 g of isoprene was used instead of 1000 g of butadiene and 25 g of tetrahydrofuran was used.

The conversion of polymerization immediately before the additional addition of the initiator was 69.4%.

15                                                                                                                        16

Physical properties of the polymer obtained are shown in Table 6.

EXAMPLE 6

Procedures of Example 1 were repeated except that a mixture of 200 g of styrene and 800 g of butadiene was used instead of 1000 g of butadiene, and 100 g of tetrahydrufuran was used. Physical properties of the polymer obtained are shown in Table 6.

EXAMPLE 7

Procedures of Example 4 were repeated except that a mixture of 200 g of styrene and 800 g of butadiene was used instead of 1000 g of butadiene initially added in Example 4, 150 g of tetrahydrofuran was used instead of 10 g of diethyleneglycol di-n-butylether, and 200 g of butadiene was added additionally at the point of additional addition of the initiator.

Physical properties of the polymer obtained are shown in Table 6.

high wet skid resistance property, small dynamic loss and also very good roll processability.

EXAMPLES 8–21 AND COMPARATIVE EXAMPLES 5–14

Table 7 shows various kinds of tread compositions according to the present invention together with their characteristic properties, and Table 8 shows tread compositions of Comparative Examples together with their characteristic properties. The basic compounding recipe for compositions of Tables 7 and 8 is as shown in Table 9.

It can be seen that in contrast with very poor processability in both of Comparative Examples 13 and 14 of Table 8 wherein high-vinyl polybutadiene having high molecular weight is employed, the processability are all improved in Examples 8–20 of Table 7 wherein low molecular weight polybutadienes were compounded. In addition, both rolling resistance index and wet grip resistance are retained respectively at a level better than

TABLE 6

|  |  | Example 5 | Example 6 | Example 7 |
|---|---|---|---|---|
| Final intrinsic viscosity | (dl/g) | 3.05 | 3.26 | 3.49 |
| Molecular weight distribution of high molecular weight polymer | ($\overline{M}w/\overline{M}n$) | 1.43 | 1.53 | 1.39 |
| Molecular weight distribution of low molecular weight polymer | ($\overline{M}w/\overline{M}n$) | 1.27 | 1.32 | 1.59 |
| Glass transition temperature of high molecular weight polymer | (°C.) | −37.8 | −40.3 | −41.7 |
| Glass transition temperature of finally formed polymer | (°C.) | −37.8 | −40.3 | −42.5 |
| Wet skid resistance property |  | 62 | 61 | 60 |
| Dynamic loss value |  |  |  |  |
| $E'' \times 10^7$ (dyne/cm$^2$) |  | 3.18 | 3.08 | 3.05 |
| $(E''/1E^{*}1^2) \times 10^{10}$ (dyne/cm$^2$)$^{-1}$ |  | 4.11 | 4.10 | 4.10 |
| $E''/E'$ |  | 0.110 | 0.107 | 0.105 |
| Roll processability (Roll nip) |  |  |  |  |
| 0.7 mm |  | 4 | 5 | 4 |
| 1.0 mm |  | 5 | 5 | 5 |
| 1.5 mm |  | 5 | 5 | 5 |
| 2.0 mm |  | 5 | 5 | 5 |

It was confirmed from Table 6 that all polymers according to the method of the present invention have that of styrene-butadiene copolymer rubber compound (Comparative Example).

TABLE 7

|  |  | Example |  |  |  |  |  |  |
|---|---|---|---|---|---|---|---|---|
|  |  | 8 | 9 | 10 | 11 | 12 | 3 | 14 |
| High molecular weight polybutadiene rubber (A) | Parts by weight | 90 | 80 | 70 | 55 | 90 | 85 | 80 |
|  | Intrinsic viscosity [η] (dl/g) | 4.02 | 4.02 | 4.02 | 4.02 | 3.23 | 3.23 | 3.23 |
|  | Glass transition point (Tg) | −39.5 | −39.5 | −39.5 | −39.5 | −38.5 | −38.5 | −38.5 |
|  | $\overline{M}w/\overline{M}n$ | 1.95 | 1.95 | 1.95 | 1.95 | 1.61 | 1.61 | 1.61 |
|  | Content of 1,2-bonding (%) | 73 | 73 | 73 | 73 | 74 | 74 | 74 |
| Low molecular weight polybutadiene rubber (B) | Parts by weight | 10 | 20 | 30 | 45 | 10 | 15 | 20 |
|  | Intrinsic viscosity [η] (dl/g) | 0.61 | 0.61 | 0.61 | 0.61 | 0.61 | 0.61 | 0.61 |
|  | Glass transition point (Tg) | −89.0 | −89.0 | −89.0 | −89.0 | −89.0 | −89.0 | −89.0 |
|  | $\overline{M}w/\overline{M}n$ | 1.20 | 1.20 | 1.20 | 1.20 | 1.20 | 1.20 | 1.20 |
|  | Content of 1,2-bonding (%) | 25 | 25 | 25 | 25 | 25 | 25 | 25 |
| Average value of content of 1,2-bonding (%) |  | 68 | 63 | 59 | 51 | 69 | 67 | 64 |
| Average intrinsic viscosity [η]A |  | 3.7 | 3.3 | 3.0 | 2.5 | 3.0 | 2.8 | 2.7 |
| Processability |  | 2 | 4 | 4 | 5 | 2 | 4 | 4 |
| Viscoelastic characteristics |  |  |  |  |  |  |  |  |
| $E^*$ kgf/cm$^2$ |  | 78 | 74 | 75 | 66 | 80 | 74 | 77 |
| $E''$ kgf/cm$^2$ |  | 11.4 | 12.2 | 14.4 | 15.7 | 12.4 | 12.0 | 13.6 |
| tan δ |  | 0.147 | 0.166 | 0.195 | 0.245 | 0.157 | 0.164 | 0.180 |
| $E''/(E^*)^2$ cm$^2$/kgf |  | 1.87 | 2.22 | 2.56 | 3.61 | 1.96 | 2.19 | 2.30 |
| Rolling resistance index |  | 87 | 89 | 94 | 100 | 89 | 89 | 92 |
| Wet grip index |  | 101 | 98 | 96 | 100 | 91 | 103 | 102 | 100 |

|  |  | Example |  |  |  |  |  |  |
|---|---|---|---|---|---|---|---|---|
|  |  | 15 | 16 | 17 | 18 | 19 | 20 | 21 |
| High molecular weight polybutadiene | Parts by weight | 72 | 34 | 52 | 32 | 50 | 23 | 39 |
|  | Intrinsic viscosity [η] (dl/g) | 3.23 | 4.02 | 3.23 | 4.02 | 3.23 | 4.02 | 3.23 |
|  | Glass transition point (Tg) | −38.5 | −39.5 | −38.5 | −39.5 | −38.5 | −39.5 | −38.5 |

TABLE 7-continued

|  |  | Example | | | | | | |
|---|---|---|---|---|---|---|---|---|
| rubber (A) | $\overline{Mw}/\overline{Mn}$ | 1.61 | 1.95 | 1.61 | 1.95 | 1.61 | 1.95 | 1.61 |
|  | Content of 1,2-bonding (%) | 74 | 73 | 74 | 73 | 74 | 73 | 74 |
| Low molecular weight polybutadiene rubber (B) | Parts by weight | 28 | 66 | 48 | 68 | 50 | 77 | 61 |
|  | Intrinsic viscosity [η] (dl/g) | 0.61 | 1.71 | 1.71 | 1.78 | 1.78 | 1.98 | 1.98 |
|  | Glass transition point (Tg) | −89.0 | −82.2 | −82.5 | −32.7 | −32.7 | −37.5 | −37.5 |
|  | $\overline{Mw}/\overline{Mn}$ | 1.20 | 1.34 | 1.34 | 1.42 | 1.42 | 1.50 | 1.50 |
|  | Content of 1,2-bonding (%) | 25 | 30 | 30 | 80 | 80 | 75 | 75 |
| Average value of content of 1,2-bonding (%) | | 60 | 45 | 53 | 78 | 77 | 75 | 75 |
| Average intrinsic viscosity [η]A | | 2.5 | 2.5 | 2.5 | 2.5 | 2.5 | 2.5 | 2.5 |
| Processability | | 5 | 3 | 3 | 3 | 3 | 2 | 3 |
| Viscoelastic characteristics | | | | | | | | |
| E* kgf/cm² | | 71 | 95 | 89 | 88 | 85 | 88 | 88 |
| E″ kgf/cm² | | 14.4 | 13.7 | 12.9 | 13.2 | 12.9 | 13.8 | 13.6 |
| tan δ | | 0.208 | 0.145 | 0.146 | 0.152 | 0.153 | 0.159 | 0.056 |
| E″/(E*)² cm²/kgf | | 2.88 | 1.52 | 1.62 | 1.72 | 1.78 | 1.79 | 1.76 |
| Rolling resistance index | | 96 | 90 | 89 | 89 | 89 | 91 | 90 |
| Wet grip index | | 98 | 86 | 88 | 105 | 104 | 102 | 103 |

TABLE 8

| Comparative Example | 5 | 6 | 7 | 8 | 9 | 10 | 11 | 12 | 13 | 14 |
|---|---|---|---|---|---|---|---|---|---|---|
| SBR 1500[1] | 100 PHR | — | — | — | — | — | — | — | — | — |
| Natural rubber | — | 100 PHR | — | — | — | — | — | — | — | — |
| High-cis butadiene rubber[2] | — | — | 100 PHR | — | — | — | — | — | — | — |
| High-vinyl butadiene rubber | — | — | — | 100 PHR | 100 PHR | 100 PHR | 100 PHR | 100 PHR | 100 PHR | 100 PHR |
| Intrinsic viscosity [η] (dl/g) | | | 1.71 | 1.78 | 2.04 | 2.12 | 2.43 | 3.23 | 4.02 | |
| Glass transition point (Tg) | −56 | −70 | −110 | −82.5 | −32.5 | −37.5 | −51.5 | −51.5 | −38.5 | −39.5 |
| $\overline{Mw}/\overline{Mn}$ | 3.1 | — | 4.3 | 1.34 | 1.42 | 1.50 | 1.56 | 1.52 | 1.61 | 1.95 |
| Content of 1,2-bonding (%) | — | — | — | 30 | 80 | 75 | 61 | 61 | 74 | 73 |
| Processability | 5 | 5 | 2 | 3 | 3 | 3 | 2 | 1 | 0 | 0 |
| Viscoelastic characteristics | | | | | | | | | | |
| E* kgf/cm² | 76 | 54 | 77 | 104 | 94 | 90 | 87 | 87 | | |
| E″ kgf/cm² | 16.8 | 10.4 | 15.9 | 16.4 | 16.2 | 15.1 | 13.7 | 12.0 | — | — |
| tan δ | 0.228 | 0.196 | 0.211 | 0.159 | 0.175 | 0.170 | 0.159 | 0.139 | | |
| E″/(E*)² cm²/kgf | 2.95 | 3.54 | 2.65 | 1.53 | 1.84 | 1.88 | 1.81 | 1.60 | | |
| Rolling resistance index | 100 | 91 | 97 | 95 | 95 | 93 | 91 | 87 | — | — |
| Wet grip index | 100 | 88 | 62 | 70 | 108 | 104 | 94 | 95 | — | — |

Note:
[1]SBR 1500, made by Sumitomo Chemical Co., Ltd.
[2]Ubepol 150, made by Ube Kosan Co.

TABLE 9

| Rubber component | 100 parts by weight |
|---|---|
| N339 carbon | 50 |
| Aromatic oil | 9 |
| Wax | 2 |
| Antioxidant IPPD | 2 |
| Stearic acid | 1 |
| Zinc white | 3 |
| Sulphur | 1.75 |
| Accelerator[Note (1)] | 1 |

(Note 1)N—Cyclohexyl-2-benzothiazylsulfenamide

What is claimed is:

1. A diene rubber composition comprising 25 to 90 parts by weight of at least one high molecular weight diene rubber (A) having an intrinsic viscosity [η] of 2.5 to 5, a $\overline{Mw}/\overline{Mn}$ value of not more than 2.0 and a glass transition point of not lower than −50° C. and 75 to 10 parts by weight of at least one low molecular weight diene rubber (B) having an intrinsic viscosity [η] of 0.1 to 0.7 and a glass transition point of not lower than −50° C., said composition having an average intrinsic viscosity of at least 1.8.

2. A composition of claim 1, wherein the $\overline{Mw}/\overline{Mn}$ value of low molecular weight diene rubber (B) is not more than 2.0.

3. A composition of claim 1, wherein the average intrinsic viscosity is at least 2.0.

4. A composition of claim 1, wherein the diene rubber (A) or (B) is polybutadiene, polyisoprene, styrene-butadiene copolymer, styrene-isoprene copolymer, isoprene-butadiene copolymer or a mixture of two or more thereof.

5. A tire wherein a diene rubber composition having an average intrinsic viscosity of at least 1.8 is employed, said composition comprising 25 to 90 parts by weight of at least one high molecular weight diene rubber (A) having an intrinsic viscosity [η] of 2.5 to 5, a $\overline{Mw}/\overline{Mn}$ value of not more than 2.0 and a glass transition point of not lower than −50° C. and 75 to 10 parts by weight of at least one low molecular weight diene rubber (B) having an intrinsic viscosity [η] of 0.1 to 0.7 and a glass transition point of not lower than −50° C.

* * * * *